United States Patent
Rambadt et al.

(10) Patent No.: US 9,189,943 B1
(45) Date of Patent: Nov. 17, 2015

(54) CHILD SAFETY SEAT ALARM

(71) Applicants: Amy Rambadt, Gravette, AR (US);
John Rambadt, Gravette, AR (US);
David Tanner, Fayetteville, AR (US)

(72) Inventors: Amy Rambadt, Gravette, AR (US);
John Rambadt, Gravette, AR (US);
David Tanner, Fayetteville, AR (US)

( * ) Notice: Subject to any disclaimer, the term of this patent is extended or adjusted under 35 U.S.C. 154(b) by 30 days.

(21) Appl. No.: 14/035,410

(22) Filed: Sep. 24, 2013

Related U.S. Application Data

(60) Provisional application No. 61/704,811, filed on Sep. 24, 2012, provisional application No. 61/788,037, filed on Mar. 15, 2013.

(51) Int. Cl.
*G08B 23/00* (2006.01)
*G08B 21/02* (2006.01)
*B60N 2/26* (2006.01)

(52) U.S. Cl.
CPC .............. *G08B 21/0205* (2013.01); *B60N 2/26* (2013.01)

(58) Field of Classification Search
CPC .... G08B 21/22; G08B 21/24; G08B 21/0205; B60N 2/002; B60N 2/28; B60N 2/26
USPC ................................ 340/539.13, 573.4, 457.1
See application file for complete search history.

(56) References Cited

U.S. PATENT DOCUMENTS

| | | | |
|---|---|---|---|
| D306,099 S | 2/1990 | Kassai | D6/333 |
| 5,581,234 A | 12/1996 | Emery et al. | 340/457.1 |
| 5,793,291 A | 8/1998 | Thornton | 340/573 |
| 5,966,070 A | 10/1999 | Thornton | 340/425.5 |
| 6,028,509 A | 2/2000 | Rice | 340/449 |
| 6,104,293 A | 8/2000 | Rossi | 340/573.1 |
| 6,812,844 B1 | 11/2004 | Burgess | 340/573.1 |
| 6,922,147 B1 * | 7/2005 | Viksnins et al. | 340/573.1 |
| 6,930,614 B2 * | 8/2005 | Rackham et al. | 340/686.1 |
| 7,009,522 B2 * | 3/2006 | Flanagan et al. | 340/666 |
| 8,659,414 B1 * | 2/2014 | Schuk | 340/457 |
| 2003/0122662 A1 * | 7/2003 | Quinonez | 340/457 |
| 2009/0079557 A1 * | 3/2009 | Miner | 340/457.1 |
| 2010/0078978 A1 * | 4/2010 | Owens | 340/686.6 |
| 2010/0253504 A1 * | 10/2010 | Lliteras et al. | 340/539.11 |
| 2013/0033373 A1 * | 2/2013 | Thomas | 340/457.1 |

* cited by examiner

*Primary Examiner* — Thomas Mullen
(74) *Attorney, Agent, or Firm* — Wright Lindsey & Jennings, LLP; Meredith K. Lowry

(57) ABSTRACT

The present invention provides an alarm to prevent guardians from forgetting a child inside a car seat carrier within a vehicle.

6 Claims, 3 Drawing Sheets

CHILD SAFETY SEAT ALARM

CROSS-REFERENCE TO RELATED APPLICATIONS

This application claims priority to and is a continuation of U.S. provisional application Ser. No. 61/704,811 filed on Sep. 24, 2012 and claims priority to and is a continuation of U.S. provisional application Ser. No. 61/788,037 filed on Mar. 15, 2013, which are both hereby expressly incorporated by reference in their entirety.

STATEMENT REGARDING FEDERALLY SPONSORED RESEARCH OR DEVELOPMENT

Not Applicable.

REFERENCE TO A MICROFICHE APPENDIX

Not Applicable.

RESERVATION OF RIGHTS

A portion of the disclosure of this patent document contains material which is subject to intellectual property rights such as but not limited to copyright, trademark, and/or trade dress protection. The owner has no objection to the facsimile reproduction by anyone of the patent document or the patent disclosure as it appears in the Patent and Trademark Office patent files or records but otherwise reserves all rights whatsoever.

BACKGROUND OF THE INVENTION

1. Field of the Invention

The present invention relates to a child safety seat with alarm for use in connection with transporting infants in vehicles. The child safety seat with alarm has particular utility in connection with notifying the driver of a vehicle that an infant is in its carrier inside of the vehicle when the driver moves away from the vehicle.

2. Description of the Known Art

Child safety seats with alarms are desirable for notifying the driver of a vehicle that an infant is in its carrier inside of the vehicle. Children frequently fall asleep when being transported in vehicles. As a result, it is possible for a driver to forget that they are transporting a child if the baby remains quiet for a long period of time. Forgetting a child inside of a vehicle can result in severe injury to or the death of the child from extreme temperature conditions and/or dehydration. Child safety seats with alarms not only protect the child in the event of accident, but also remind the driver of the presence of the child through visual and audio alerts.

The use of child alert systems for automobiles is known in the prior art. For example, U.S. Pat. No. 5,793,291 to Thornton discloses a child alert system for automobiles. However, the Thornton '291 patent has a significant drawback of not sounding an alarm until a potentially dangerous temperature has already been reached inside of the vehicle.

U.S. Pat. No. 6,812,844 to Burgess discloses a child seat with a built-in alarm that alerts if the door is opened. However, the constant alerting by Burgess's system—as the door will always be opened even if the parent hasn't forgotten the child—inefficiently drains the power supply of the alarm and also will unnecessarily wake a sleeping child.

U.S. Pat. No. 6,104,293 to Rossi discloses a warning system for detecting presence of the child in an infant seat that detects the state of the vehicle's ignition system. However, the Rossi '293 patent overly complicates the alarm system by not only detecting a child is present, but also detecting whether the vehicle is still operating. This complicated dual detection system allows for potential failure of the system.

Similarly, U.S. Pat. No. 5,966,070 to Thornton discloses a child alert alarm for automobiles that detects the presence of a child locked within a parked automobile during extreme temperatures. However, the Thornton '070 patent cannot sound an alarm until a potentially dangerous temperature has already been reached inside of the vehicle.

In addition, U.S. Pat. No. 5,581,234 to Emery et al. discloses an infant vehicle seat alarm system that produces an audible or visual warning when the seat/carrier component is initially aligned on the base component, not locked onto the base component, or when the harness is in an unused state. However, the Emery et al. '234 patent does not alert the driver to the presence of an infant when the driver is away from the vehicle.

Furthermore, U.S. Pat. No. 6,028,509 to Rice discloses a voice-activated vehicle alarm system that generates an output signal in response to signals from a temperature sensor and a sound detector. However, the Rice '509 patent lacks the ability to sound an alarm until a potentially dangerous temperature has already been reached inside of the vehicle.

Lastly, U.S. Pat. No. Des. 306,099 to Kassai discloses a child's safety seat for an automobile. However, the Kassai '099 patent does not generate an alarm when the driver is away from the vehicle.

While the above-described devices fulfill their respective, particular objectives and requirements, the aforementioned patents do not describe a child safety seat with alarm that allows notifying the driver of the vehicle that an infant is in its carrier inside of the vehicle when the driver steps away from the vehicle. Therefore, a need exists for a new and improved child safety seat with alarm that can be used for notifying the driver of the vehicle that an infant is in its carrier inside of the vehicle when the driver steps away from the vehicle. In this regard, the present invention substantially fulfills this need. In this respect, the child safety seat with alarm according to the present invention substantially departs from the conventional concepts and designs of the prior art, and in doing so provides an apparatus primarily developed for the purpose of notifying the driver of the vehicle that an infant is in its carrier inside of the vehicle when the driver moves away from the vehicle.

SUMMARY OF THE INVENTION

In view of the foregoing disadvantages inherent in the known types of child alert systems for automobiles now present in the prior art, the present invention provides an improved child safety seat with a remote alarm system secured to the vehicle key, and overcomes the above-mentioned disadvantages and drawbacks of the prior art. As such, the general purpose of the present invention, which will be described subsequently in greater detail, is to provide a new and improved child safety seat with alarm which has all the advantages of the prior art mentioned heretofore and many novel features that result in a child safety seat with alarm which is not anticipated, rendered obvious, suggested, or even implied by the prior art, either alone or in any combination thereof.

To attain this, the present invention essentially comprises a child safety seat having a buckle which requires a latching pin from a latching housing to be inserted within the buckle to fully latch. When released from the housing, the latching pin broadcasts a signal to the housing while the housing is in range. Once the housing moves out of the range of the latching pin, the housing alerts to remind the parent that there is a child latched in the seat and outside of the range of the parent.

The invention may also include a speaker and lights comprising the alarm. The power source may consist of one single or multiple batteries. A device to monitor the status of the power source and alert the user of a problem with the power source may be employed. The switch may be attached to the buckle to monitor the closure status of the buckle. The power source may be contained within a battery compartment having a hingedly attached lid. There are, of course, additional features of the invention that will be described hereinafter and which will form the subject matter of the claims attached.

Numerous objects, features and advantages of the present invention will be readily apparent to those of ordinary skill in the art upon a reading of the following detailed description of presently current, but nonetheless illustrative, embodiments of the present invention when taken in conjunction with the accompanying drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved child safety seat with alarm that has all of the advantages of the prior art child alert systems for automobiles and none of the disadvantages.

It is another object of the present invention to provide a new and improved child safety seat with alarm that may be easily and efficiently manufactured and marketed.

An even further object of the present invention is to provide a new and improved child safety seat with alarm that has a low cost of manufacture with regard to both materials and labor, and which accordingly is then susceptible of low prices of sale to the consuming public, thereby making such child safety seat with alarm economically available to the buying public.

Still another object of the present invention is to provide a new child safety seat with alarm that provides in the apparatuses and methods of the prior art some of the advantages thereof, while simultaneously overcoming some of the disadvantages normally associated therewith.

Even still another object of the present invention is to provide a child safety seat with alarm for notifying the driver of the vehicle that an infant is in its carrier inside of the vehicle when the driver moves a distance away from the carrier.

A further object of the present invention is to provide a child safety seat with alarm for notifying the driver of the vehicle that an infant is in its carrier through both audible and visual alerts within the driver's presence.

These together with other objects of the invention, along with the various features of novelty that characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated current embodiments of the invention.

BRIEF DESCRIPTION OF THE SEVERAL VIEWS OF THE DRAWINGS

In the following drawings, which form a part of the specification and which are to be construed in conjunction therewith, and in which like reference numerals have been employed throughout wherever possible to indicate like parts in the various views.

DETAILED DESCRIPTION OF THE INVENTION

Figure 1:
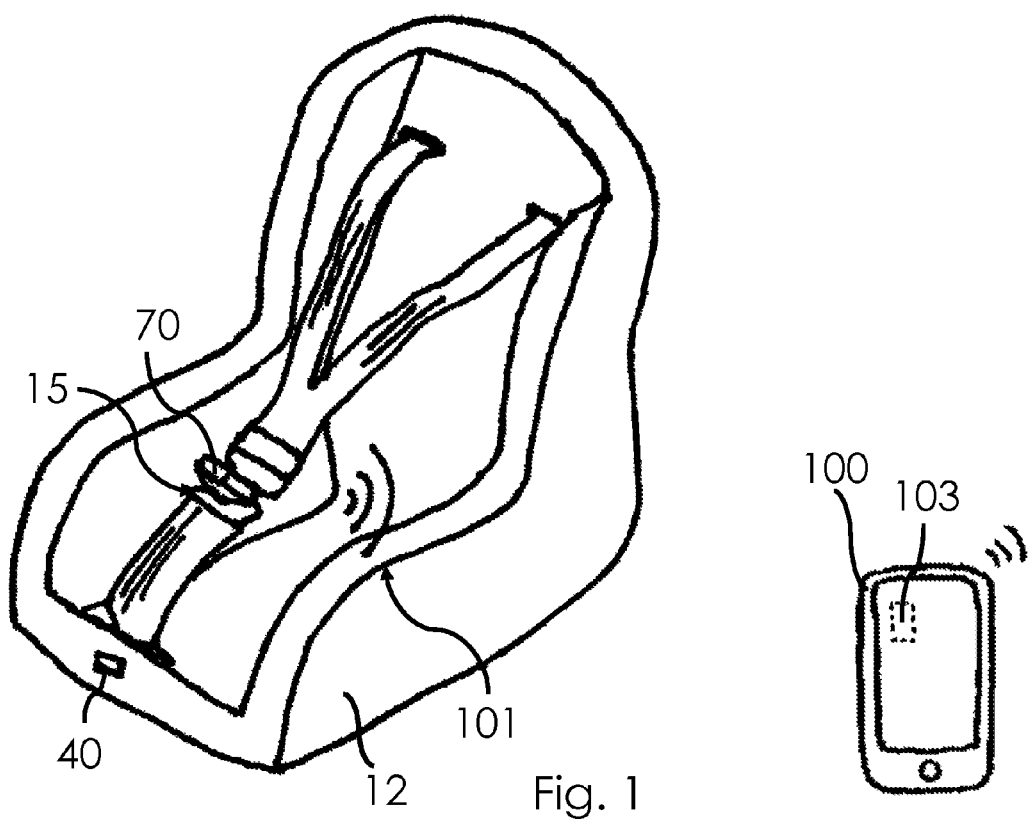
FIG. 1 is an environmental view of our invention with the housing and latching pin inserted in the child seat buckle.
Figure 2:
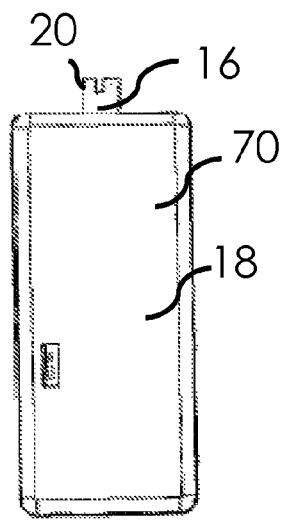
FIG. 2 is a top plan view of the alarm system.
Figure 4:
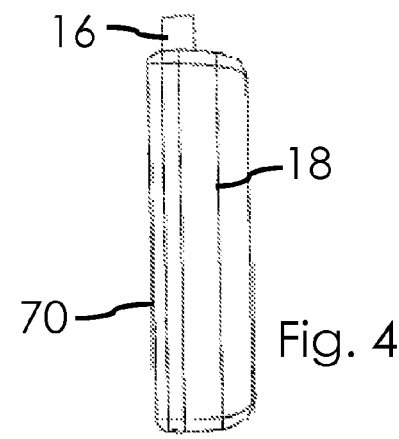
FIG. 4 is a right side elevational view of the same, the left side being a mirror image.
Figure 3:
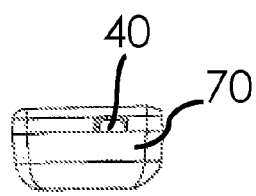
FIG. 3 is a back elevational view of the same.
Figure 5:
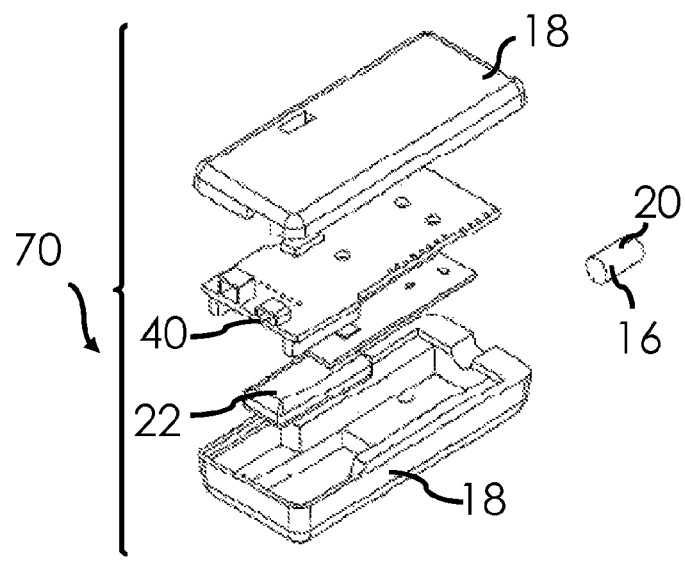
FIG. 5 is an exploded view thereof.

Referring now to the drawings, and particularly to FIG. 1, a current embodiment of the child safety seat with alarm of the present invention is shown and generally designated by the reference numeral 10.

In FIG. 1, a new and improved child safety seat having an alarm system 10 of the present invention for notifying the driver of the vehicle that an infant is in its carrier inside of the vehicle when the driver moves a distance away from the carrier is illustrated and will be described. More particularly, the child safety seat with alarm system 10 has a child safety seat 12 in place of a vehicle seat.

In one embodiment shown in FIG. 1, the alarm system 10 may be secured to the buckle system 15 of the child safety seat. In this manner, when the female end (not shown) of the buckle system 15 receives the male end of the buckle (not shown), the alarm system 10 is engaged.

As shown in FIG. 1 in one embodiment, the buckle 15 for a child safety seat is shown in a closed position with the alarm system 10 inserted within the buckle. In order for the alarm system 10 to engage, the buckle 15 must latch fully. Once the male end is inserted in the latch of the buckle 15, a switch is activated within a transceiver 70 to broadcast a wireless communications signal. The transceiver 70 can include an antenna that can be disposed internal to a radio-transparent portion of the system 10. The wireless communications can be based on many different wireless protocols including for example 4G, 3G, 2G, Bluetooth, RF, 802.11, FM, AM, and so on. The transceiver 70 may additionally be configured with GPS technology to allow for positioning of the system 10.

The transceiver 70 may be initialized to a portable electronic device, such as a GPS-capable cell phone 100, that is carried by the guardian of the child. Once male end is inserted in the latch of the buckle 15, the transceiver 70 broadcasts a wireless communications signal to the portable electronic device 100. The transceiver 70 may then continuously provide a wireless signal to the portable electronic device 100 or then provide an ending wireless communications signal to the portable electronic device 100. The wireless communication signal provides the location of the transceiver.

The portable electronic device 100 may include a location determining device 103, such as a Global Positioning System (GPS) device, a triangulation device, or through wi-fi assessment, for providing location information in the form of, for example, latitude and longitude values. The portable electronic device 100 may transmit, via a communication network (not shown), some or all of the received data to a central server (not shown), or similar network entity or mainframe computer system. The portable electronic device 100 is configured 500 through the use of the GPS capabilities of the device 103 to validate the GPS location of the portable electronic device 100. Once the transceiver 70 provides a wireless communications signal 101, the location of the portable electronic device 100 is received 540 and confirmed as is the location of the transceiver 70. The proximity distance of the transceiver from the electronic device 100 is established 510 and monitored 550. If the portable electronic device 100 moves out of an acceptable range for the proximity distance from the transceiver 70, such as more than 20 feet, then an alert may issue. It is envisioned that an alert on the seat itself, through the electronic device 100 or through the alarm system of the car if configured with the device 10, may issue. The alert can be an audio alert, such as music or a voice yelling "Bad Dad" or other configured audio messages, and also visual, such as the lights flashing.

The alarm system may additionally use a monitoring signal 40, such as a lit LED indicator, to notify the user that the system 10 is still monitoring the signal that sufficient power supply is available.

As shown in FIGS. 2-5, the alarm system 10 transceiver 70 generally includes a latching pin 16 releasably connected to a housing 18 with a power supply 22 located therein. The housing 18 is generally fashioned to be a small device, such as a key fob, to allow for the housing 18 to be secured to a key ring (not shown) connected to the ignition key for the vehicle. In this manner, the housing 18 is coupled to the ignition key such that if the ignition key is removed from the vehicle after the vehicle is turned off, the housing 18 is also removed from the vehicle.

In the second embodiment of FIGS. 2-5, in order for the buckle 15 to latch fully, the alarm system 10 must engage first with the buckle 15 to insert the latching pin 16 releasably positioned at the end of the housing 18 of the alarm system 10. The latching pin 16 has a keyed end 20 which fits within an aperture (not shown) in the latch of the buckle 15. The release of the latch is similar to those in the prior art, allowing the parent to simply push the latch to release the latch from the buckle 15.

Once the latching pin 16 is inserted 520 in the latch of the buckle 15, a switch is activated within the latching pin 16 that allows a small transmitter, RF, Bluetooth® or similar transmitter, to broadcast 530 a low-range signal, such as ten to twenty feet, to a receiver within the portable electronic device. If the portable electronic device 100 is removed 560 from the range of the transmitter, then the receiver cannot complete the loop and an alert 570 is sent to the portable electronic device 100 to provide an alarm. The portable electronic device 100 then provides an alarm, such as a constant vibration, sound, or light alert to notify the driver that a child remains in the vehicle. The driver then can release 565 the child from the seat, releasing the latching pin 16.

Figure 6:
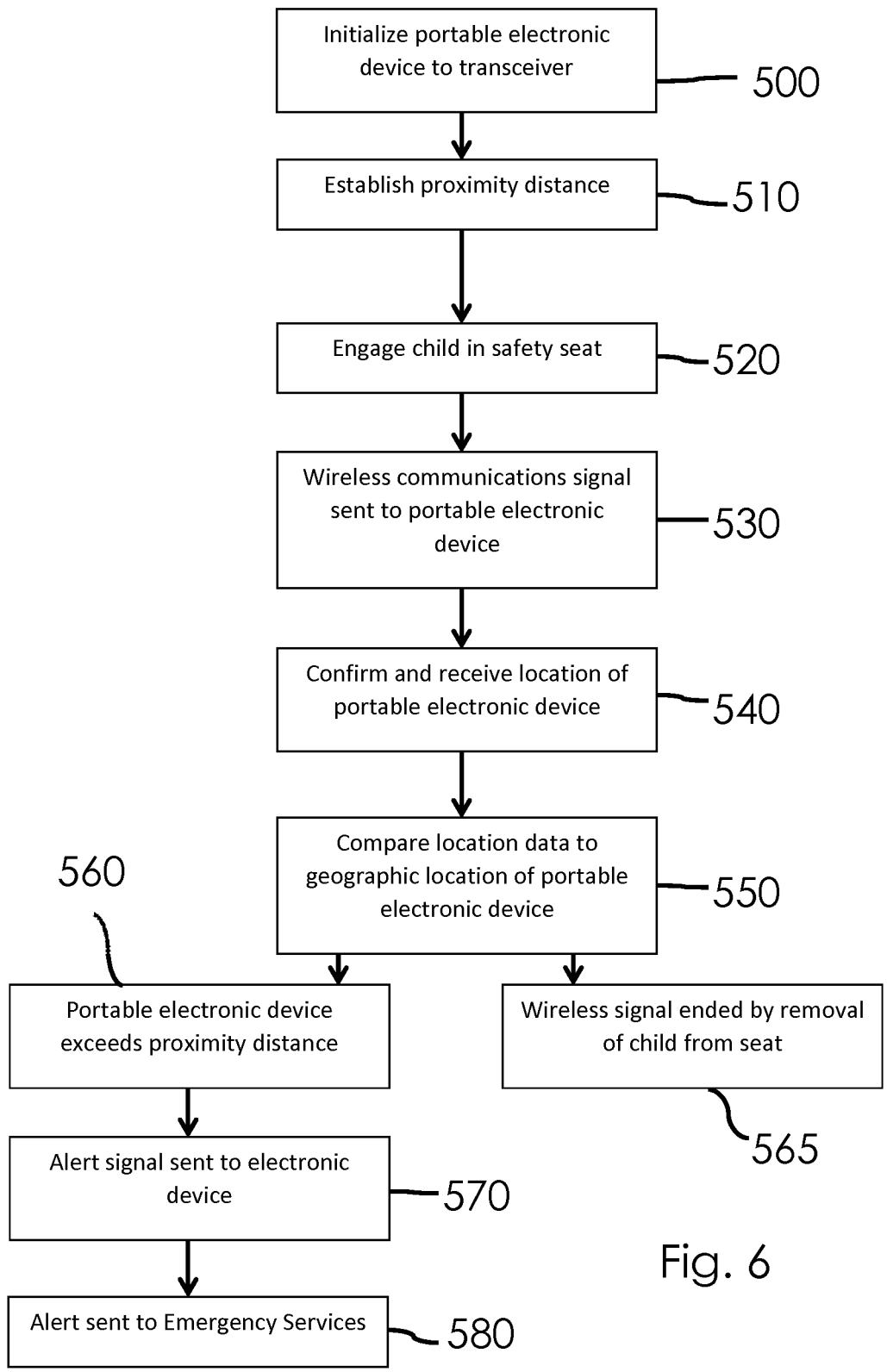
FIG. 6 is a flow chart showing the method of use for the current invention.

It is envisioned that the alarm system 10 may utilize a content server system accessed through the portable electronic device 100 to record safety information. As shown in FIG. 6, emergency services can be notified 580 if the electronic device moves a great deal from the seat, such as 50 feet. The user of the system 10 can provide safety information, such as the details about the vehicle, the child's medical history, or contact information. This information can then be transmitted to emergency services or can be used to contact the user. Additionally, the user can configure the alerts to be used on the system 10, such as the warning signals and the distances for alerting the user is out of range to allow for user-selected alerts and ranges. It is also envisioned that the alarm system 10 may be configured with on board computing systems with the vehicle, like Onstar® that can then be contacted if the electronic device is out of range to then unlock the vehicle remotely.

From the foregoing, it will be seen that this invention well adapted to obtain all the ends and objects herein set forth, together with other advantages which are inherent to the structure. It will also be understood that certain features and subcombinations are of utility and may be employed without reference to other features and subcombinations. This is contemplated by and is within the scope of the claims. Many possible embodiments may be made of the invention without departing from the scope thereof. Therefore, it is to be understood that all matter herein set forth or shown in the accompanying drawings is to be interpreted as illustrative and not in a limiting sense.

When interpreting the claims of this application, method claims may be recognized by the explicit use of the word 'method' in the preamble of the claims and the use of the 'ing' tense of the active word. Method claims should not be interpreted to have particular steps in a particular order unless the claim element specifically referring to a previous element, a previous action, or the result of a previous action. Apparatus claims may be recognized by the use of the word 'apparatus' in the preamble of the claim and should not be interpreted to have 'means plus function language' unless the word 'means' is specifically used in the claim element. The words 'defining,' having,' or 'including' should be interpreted as open ended claim language that allows additional elements or structures.

What is claimed is:

1. A system for monitoring a child left in a child safety seat having a buckle, the system comprising:
   a transceiver having a latching pin configured to secure to the buckle of the child safety seat, said transceiver further configured to broadcast a wireless communication signal identifying the location of said transceiver upon securing to the buckle of the child safety seat;
   a portable electronic device configured to receive said wireless communication signal, said portable electronic device configured to identify the location of said portable electronic device and determine a distance of said portable electronic device to said transceiver; and
   said portable electronic device programmed to provide an alert to a user if said portable electronic device exceeds an established distance between said portable electronic device and said transceiver.

2. The system of claim 1, said alert comprising an audio alert.

3. The system of claim 1, said portable electronic device having a programmed audio message.

4. An alarm system for monitoring a child left in a child safety seat having a buckle, the system comprising:
   a transceiver coupled to a sensor and configured to broadcast a wireless communication signal identifying the location of said transceiver, said transceiver further comprising a latching pin having a keyed end configured to secure to the buckle of the child safety seat when the buckle is latched;
   a portable electronic device configured to receive said wireless communication signal, said portable electronic device configured to identify the location of said portable electronic device and determine a distance of said portable electronic device to said transceiver; and said portable electronic device programmed to provide an alert to a user if said portable electronic device exceeds an established distance between said portable electronic device and said transceiver.

5. The system of claim 4, said alert comprising an audio alert.

6. The system of claim 4, said portable electronic device having a programmed audio message.

* * * * *